(12) United States Patent
Lin et al.

(10) Patent No.: US 6,931,296 B2
(45) Date of Patent: Aug. 16, 2005

(54) ALGORITHMS TUNNING FOR DYNAMIC LOT DISPATCHING IN WAFER AND CHIP PROBING

(75) Inventors: Ta-Chin Lin, Taipei (TW); Yi-Feng Huang, Hsin-Chu (TW); Fu-Kang Lai, Hsin-Chu (TW); Jen-Chih Hsiao, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 14 days.

(21) Appl. No.: 10/672,403

(22) Filed: Sep. 26, 2003

(65) Prior Publication Data

US 2005/0071031 A1 Mar. 31, 2005

(51) Int. Cl.[7] .............................................. G06F 19/00
(52) U.S. Cl. ...................................... 700/101; 702/118
(58) Field of Search ....................... 700/95–97, 99–106, 700/108–110, 121, 32, 33, 83; 702/121, 118, 117, 182, 183, 185

(56) References Cited

U.S. PATENT DOCUMENTS

| | | | |
|---|---|---|---|
| 5,219,765 A | * 6/1993 | Yoshida et al. ................ 438/10 |
| 5,546,326 A | 8/1996 | Tai et al. ....................... 702/84 |
| 5,612,886 A | 3/1997 | Weng .......................... 700/101 |
| 5,696,689 A | 12/1997 | Okumura et al. ........... 700/121 |
| 5,721,686 A | 2/1998 | Shahraray et al. ........... 700/102 |
| 5,748,478 A | 5/1998 | Pan et al. ...................... 700/94 |
| 5,751,580 A | 5/1998 | Chi ............................. 700/101 |
| 5,818,716 A | 10/1998 | Chin et al. .................. 700/100 |
| 5,826,238 A | 10/1998 | Chen et al. ..................... 705/8 |
| 5,841,677 A | 11/1998 | Yang et al. .................. 702/176 |
| 5,889,673 A | 3/1999 | Pan et al. ...................... 700/97 |
| 5,928,389 A | * 7/1999 | Jevtic ......................... 29/25.01 |
| 5,950,170 A | 9/1999 | Pan et al. ....................... 705/7 |
| 5,975,740 A | * 11/1999 | Lin et al. ...................... 700/99 |
| 6,256,548 B1 | 7/2001 | Lin ............................. 700/121 |
| 6,256,550 B1 | 7/2001 | Wu et al. .................... 700/121 |
| 6,470,231 B1 | * 10/2002 | Yang et al. ................. 700/121 |
| 6,662,066 B1 | * 12/2003 | Yu et al. ..................... 700/108 |

* cited by examiner

*Primary Examiner*—Leo Picard
*Assistant Examiner*—Chad Rapp
(74) *Attorney, Agent, or Firm*—Thomas, Kayden, Horstemeyer & Risley

(57) ABSTRACT

A method and system for flexible, comprehensive, on-line, real-time dynamic lot dispatching in a semiconductor test foundry based on a two-phased, event-driven dispatching system structure. An adjustable priority formula and tuned algorithms integrated with PROMIS' constraint function give a nearly optimum dispatching list on any tester at any time with reduced mistake operations. Exception rules take care of special events to improve daily dispatching manual effort. This invention can automatically dispatch engineering lots according to engineering lots' capacity of Testing, solve conflict between wafer and package lots, efficiently reduce tester setup times, replace daily manual-dispatching sheet and keep a high CLIP rate while fully following MPS.

26 Claims, 11 Drawing Sheets

| Generation | 1 | 11 | 14 | 16 |
|---|---|---|---|---|
| Name | Quickly Scheduler | DLD | DLD | This new version |
| System Type | Off-line | On-line, Real Time | On-line, Real Time | On-line DLD |
| Algorithm Type | Heuristic Algorithm | Multi-Priority Factor Multi-Dispatching Algorithm | Multi-Priority Factor Multi-Dispatching Algorithm | Multi-Priority Factor Multi-Dispatching Algorithm |
| Take Care MPS | No | Yes | Yes | Yes |
| Take Care Lot Due Date | Yes | Yes | Yes | Yes |
| Dispatching Subject | Production Lot | Production Lot | Production Lot | Production Lot and Engineering Lot |
| Dispatching Subject Type | Wafer | Wafer | Wafer | Wafer and PKG |
| Dispatching Subject Stage | Test-INV/Sort1/Sort2 | Sort1/Sort2 | Sort1/Sort2 | Test-INV/Sort1/Sort2/FT-BANK/F-Test/INKING |
| Take Care Production | None | P/C | P/C | P/C, L/B for Wafer and L/B for PKG |
| Production Apparatus Type | None | For single device apparatus behavior | For single device apparatus behavior | For multi-devices using the same apparatus behavior |
| Scale in Taking Care Setup Time | Only take care the same PART ID to reduce setup time | Only take care the same PART ID to reduce setup time | Only take care the same PART ID to reduce setup time | Follow this sequence [Don't change test program] > [Don't change P/V] > [Don't change L/B] > [Don't change production type CP,FT] to |
| Take Care Hardware and Software Special Constraint Information | None | None | Take care them as planning problem on exception rule system | Line PROMIS constraint function to take care them, and DLD exception rule system rule only for planning problem |
| MES Environment | PROMIS | POSIDON | POSIDON | PROMIS |
| Performance | Off-line system running 10 min, & manual tuning 4 hrs for all tester one day dispatching | Around 5 sec for one tester next dispatching lot | Around 5 sec for one tester next dispatching lot | Around 7 sec for one tester next dispatching lot |

FIG. 1

ALGORITHMS TUNNING FOR DYNAMIC LOT DISPATCHING IN WAFER AND CHIP PROBING

BACKGROUND OF THE INVENTION

1. Field of Invention

This invention relates generally to the dispatching of lots of work in a semiconductor foundry and, more particularly, to a comprehensive, dynamic, and real-time dispatching system for semiconductor testing.

2. Description of Related Art

Generally, test operation is the last stage of semiconductor manufacture with the main objectives of separating out bad dies and packages and feeding back the test results. This checking quickly improves product yield. According to the tested product type, test operation is classified as Chip Probing (CP) and Final Testing (FT). These two kinds of test operation use different auxiliary apparatus, but they both have to use the tester to do the test operation. Tester capacity varies and is expensive and limited, but it is also a main resource in test operation, especially in the test foundry. From the viewpoint of production management, tester capacity usage comprises production time for product that needs to be shipped out to external customers in response to orders, engineering time for engineering products that come from some internal experiment for developing advanced technique or monitor operation for stabilizing wafer yield, and idle time. One way to achieve more production time for doing test operations (which would result in increased throughput of product and reduced cycle time of lots) is to efficiently reduce setup time (a part of idle time) taking into account the weekly Master Production Schedule (MPS) target provided by Production Control (PC).

Lot dispatching in a CP/FT test operation can be complex and needs to consider special dispatching properties such as sequence dependent changeover or setup time, re-entrant product flow, various delivery plan requests based on semiconductor foundry business, exception management, and urgent lots interrupting test system behavior. Intelligently arranging and adjusting the lot dispatch list on every tester for full use of tester capacity, on-time delivery, and maximum throughput all at the same time is very important in the management of testing production.

Currently, a Dynamic Lot Dispatching (DLD) system is operating on a test site using the POSEIDON Manufacturing Execution System (MES). The benefits have been such that it is now desirable to transfer this system to other testing sites. Some of these testing sites use PROMIS instead of POSEIDON. Since a DLD system is very closely connected with the MES, a new version needs to be developed that would integrate with PROMIS constraint system and also take care of some situations that the original design of the DLD system did not consider such as dispatching engineering lots according to engineering lots capacity of Testing, solving dispatching conflict between wafer and package lots, and efficiently reducing tester setup times.

Prior approaches include a method of controlling lot dispatches of tool groups, and a method and system for manufacturing using dynamic dispatching of integrated circuit wafer. Other prior art approaches include a method and apparatus for dispatching lots in a factory, as well as a method of controlling lot dispatches of tool groups, and a method to maximize capacity in integrated circuit fabrication. Additional methods and systems for manufacturing using dynamic dispatching of integrated circuit wafer lots are available as is method and apparatus for dispatching lots in a factory. Also, a method and apparatus for control and evaluation of pending jobs in a factory, along with a method and system for the dynamic dispatching in semiconductor manufacturing plants. Another prior art dynamic dispatching method is rule based using the long-term due date and short-term queue time to improve delivery performance. A dynamic lot dispatching method plus a fuzzy logic method and system for adjustment of priority rating of work in process in a production line is included. Output management of processing in a manufacturing plant is another prior art method, as is method for daily target generation and machine allocation with priority. Also, an overall equipment effectiveness on-line categories system and method, and a dispatch and conveyer control system for production control system of a semiconductor substrate is in the prior art.

SUMMARY OF THE INVENTION

The overall objective of this invention is to create a comprehensive method and system for the dynamic adjustment of priority and step procedures for determining effective lot dispatching for wafer and chip probing in a semiconductor testing and manufacturing facility. A more specific objective is to create a two-phased, event-driven dispatching system structure for dynamic adjustment. Using step procedures, another objective is to efficiently choose work lots that can utilize incorporated auxiliary apparatus without the need for a costly new setup.

Additionally, yet another objective is to provide for the use of an engineering lot capacity limitation check in the step procedure to see if the amount of fixed testing time per week determined by testing site personnel for engineering lots to be tested on any particular machine has been exceeded. Another objective is to be able to solve the dispatching conflict between wafer and package lots. A final objective is to limit a tester's capability in product through the use of a common constraint system so that a wrong lot list can not be dispatched for a tester resulting in a mistake operation.

BRIEF DESCRIPTION OF THE DRAWINGS

This invention will be described with reference to the accompanying drawings, wherein:

FIG. 1 is a comparison table of prior art and new version of scheduling/dispatching systems for testing.

DETAILED DESCRIPTION OF THE PREFERRED EMBODIMENT

Figure 2:
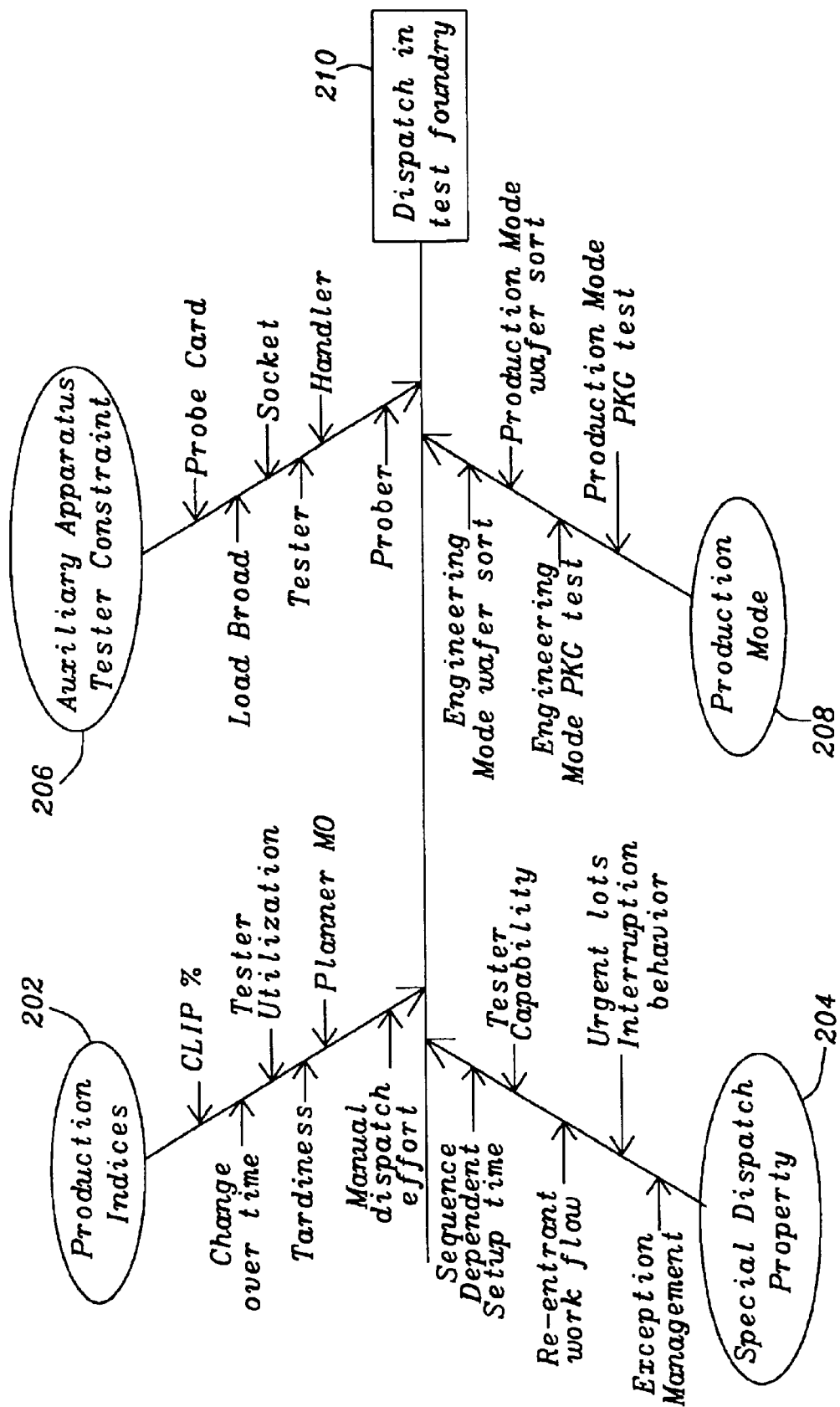
FIG. 2 is a flow diagram of cause and effect in test dispatching.

In the past, the main task of the test foundry planner was to prepare a lot dispatching sheet that showed lot assignment sequence on every tester for the next day on the shop floor as can be seen in the Quickly Scheduler column 12 of the comparison of three versions of scheduling/dispatching systems for testing chart of FIG. 1. In order to get a good dispatching result, the planner had to collect all the related Work in Progress (WIP) and production information such as basic engineering records of product, parameter value of the lots from the Manufacturing Execution System (MES), production target or Master Production Schedule (MPS) that Production Control (PC) provided, and the related auxiliary apparatus of the product from the material control system in advance every day. Taking into consideration the running situation of every tester, current production target execution status, and production strategies developed in daily meetings, the planner spent a great deal of time combining this information with dispatching concept to manually derive lot assignment sequence lists for every tester. With this type of manual scheduling and dispatching procedure, it is very difficult to achieve improved performance indices in an environment characterized by dynamic production situations and complex production constraints and requests.

FIG. 1 shows three versions of Dynamic Lot Dispatching corresponding to three generations of development. Two prior art systems with the column headings I, Quick Scheduler, 12 and II, DLD 14, and the On-line DLD 16 system of the invention, with the column heading This new version—On-line DLD. Various characteristics of the three systems are indicated in the first column. As can be seen in the first row corresponding to System Type, I is off-line ,II is Online, Real Time and, the system of the invention is on-line and works in real time. The Algorithm type row shows that I uses a Heuristic Algorithm, where the later versions use Multi-Priority Factor, as well as Multi-Dispatching Algorithm. As noted in the rows labeled Take Care MPS and Take Care Lot Due Date, the system of the invention takes into account the Master Production Schedule and the lot due date.

For Dispatching Subject Type, the new system of the invention handles both the Production Lot and the Engineering Lot. For the Dispatching Subject Type, the new system both the Wafer and the package (PKG). For the Dispatching Subject Stage, in addition to Testing (Test-INV) and sorting (Sort1/Sort2), the system of the invention does a functional test (FT-BANK/F-Test) and inking. For Take Care Production, the new invention handles not only P/C, but L/B for wafer and L/B for packaging (PKG). For Production Apparatus Type the new version not only deal with single device apparatus behavior, but multi-devices using the same apparatus behavior. The Scale in Taking Care Setup Time Only takes care of the same Part ID to reduce setup time in the prior art versions. In the new invention, it allow following a sequence that does not change the test program. For Take Care Hardware and Software Special Constraints Information from taking care of them as planning problem on an exception rule system, to the new invention that uses PROMIS constraints function, and using DLD exception rule system only for planning problems. For the MES Environment where the earlier system went from PROMIS, then to POSIDOM, the system of this invention now settles on PROMIS. Finally, Performance goes from an off-line system running 10 minutes, and requiring manual tuning of 4 hours for all tester one day dispatching, to around 5 seconds from one tester next despatching lot, to the new system of this invention to around 7 seconds for one tester next dispatching lot.

The new version has improvements such as capability of dispatching engineering lots in addition to production lots, provision for the dispatch of packages as well as wafers, consideration of load boards for wafers and packages in addition to the probe card, the ability to consider other than same part ID when seeing if the same test program, probe card, load board or production type can be used in an attempt to reduce setup time, and the use of PROMIS constraint function to take care of hardware and software special constraint information thereby leaving the exception rule system only for planning problems.

The cause and effect diagram of FIG. 2 gives an overall view of what affects Dispatch in a Test Foundry 210. Production Indices 202 (CLIP percentage, Change over time, Tester Unitization, Planer MO, and Manual dispatch effort), Special Dispatch Properties 204 (Exception Management Urgent lot Interruption behavior, Re-entrant work flow, Tester Capability, and Sequence Dependent Setup time), Auxiliary Apparatus or Tester Constraints 206 (Probe Card, Load Broad, Socket, Tester, Handler, and Prober), and Production Mode 208 (Production Moe PKG test, Engineering Mode PKG test, Production Mode wafer sort, and Engineering Mode wafer sort) all impact how dispatch will occur. Production Indices 202 include such things as CLIP% (amount of reached Master Production Schedule (MPS) items/amount of total MPS items), tester utilization (total running time/total capacity time, setup time for changeovers, tardiness of lots, manual dispatching effort, and planners' mistake operations (Planner MO). Special Dispatch Properties 204 include such things as sequence dependent setup time, re-entrant work flow coming from different routing or re-sort workflow needing different priority assignment, exception management by production control and engineers, tester capability, and urgent lots interruption behavior. Auxiliary apparatus or tester constraints 206 include load boards, testers, probers, probe cards, sockets, and handlers. Production Mode 208 includes production mode wafer sort and package test and engineering mode wafer sort and package test.

Figure 3:
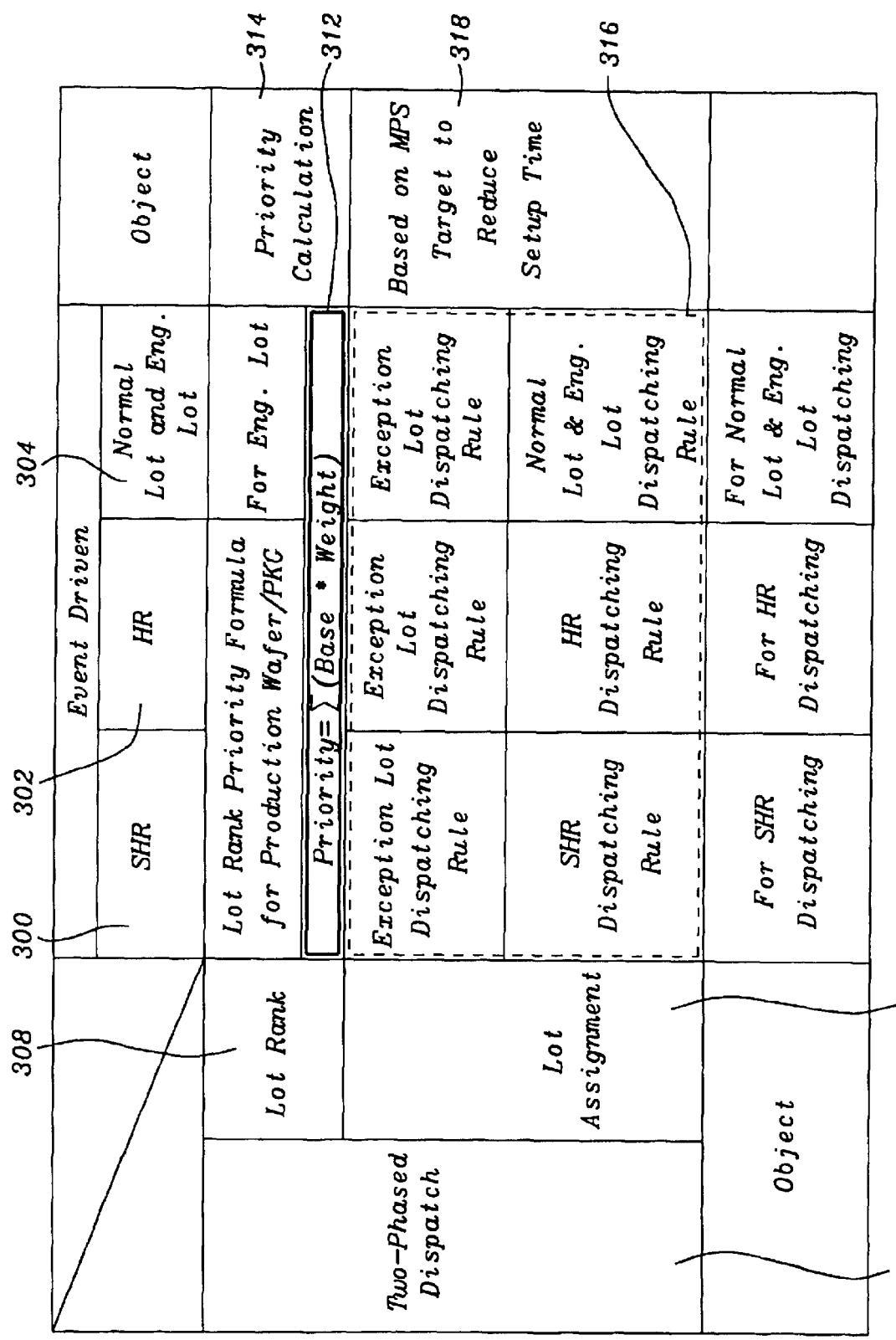
FIG. 3 is a table diagram that gives an overview of the two-phased, event-driven dispatching system structure with step procedures.

The table diagram of FIG. 3 gives an overview of the two-phased event-driven dispatching system structure with step procedures. The events driving this two-phased system are the processing of Super Hot Runs (SHR) 300, Hot Runs (HR) 302, and Normal and Engineering Lots 304. The Two-Phased Dispatch 306 consists of Lot Rank 308 and Lot Assignment 310. Lot rank 308 for both production wafer/package and engineering lots is calculated using the formula Priority=$\Sigma$(Base*Weight$_x$) 312 where x is the item number. An item is the priority factor being considered such as commit due date or hot run lot, etc. The adjustable weight value is the factors' importance level and the base increases exponentially with each item of more importance. The object of this formula is to provide Priority Calculation 314. The step procedures or dispatching rule 316 (of Lot Assignment 310) consists of exception lots, super hot run, hot run, normal lot, and engineering lot dispatching rule and strives for tester utilization, minimum setup time and maximum throughput dispatching performance Based on MPS Target to Reduce Setup Time 318. The exception lot dispatching rule handles special situations entered into an exception rule control Graphic User Interface (GUI) in advance and handled automatically by the system. Two kinds of exception events are capacity allocation for special assignment requests and wafer output control that can indirectly change the weight value of priority factors to control dispatching sequence result. These and the other step procedure dispatching rules for SHR, HR, and normal and engineering lots are best described by the flow charts of FIGS. 4A, 4B, 4C, 5A, 5B, and 6A, 6B, 6C and 6D.

Figure 4A:
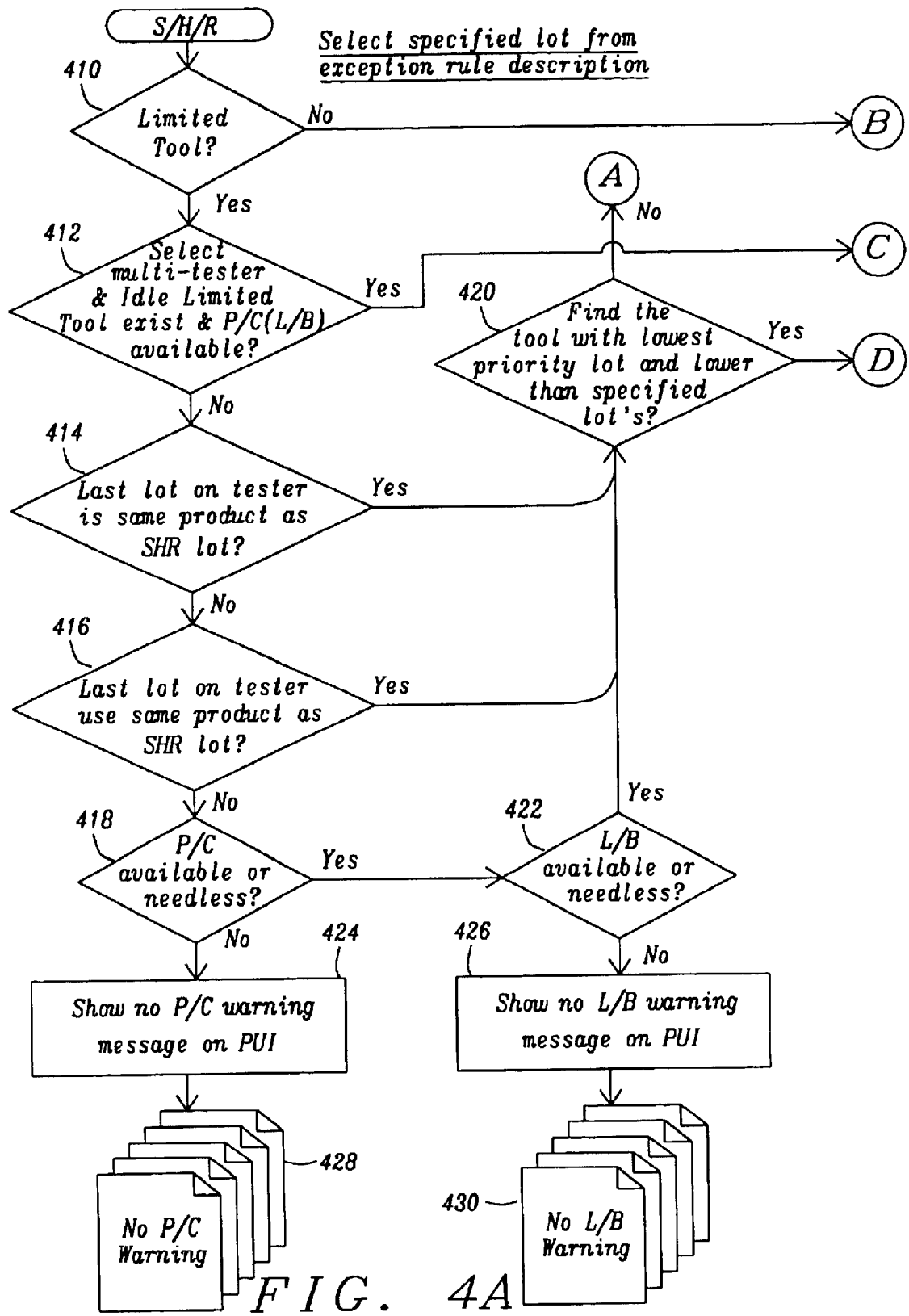
FIGS. 4A, 4B, and 4C are a flow diagram of the Super Hot Run (SHR) lot-assignment step procedures in the new method.
Figures 4B, 4C:
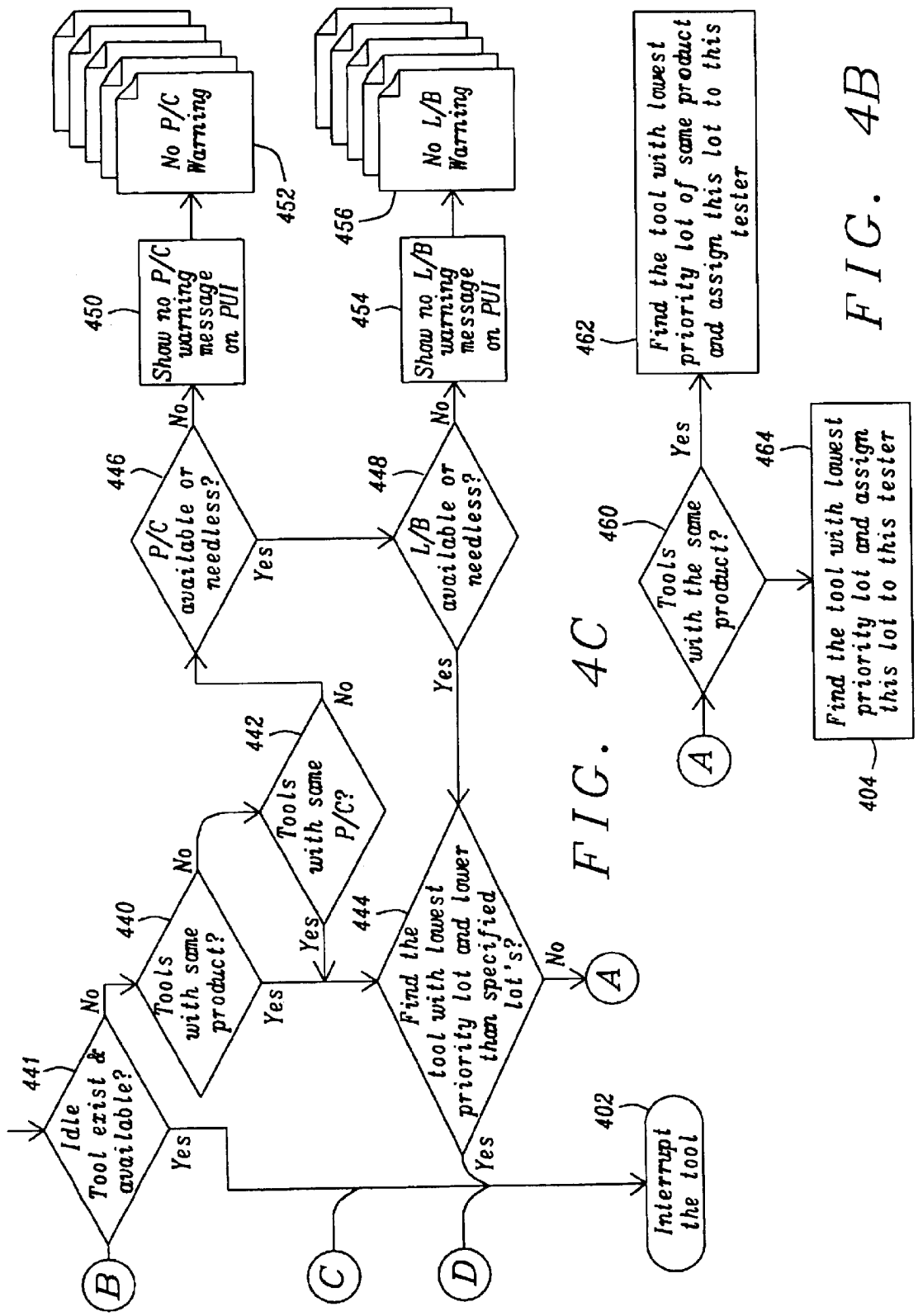

The lot assignment step procedures for assigning Super Hot Runs (SHR) of FIGS. 4A, 4B, and 4C show how the yes or no answer at each step puts it to a proper next step with the goal of maximum tester utilization, minimum setup time, and maximum throughput dispatching performance. Logic to Select specified lot from exception rule description is shown in FIG. 4A Limited Tool 410, and Select multi-tester-tester & Idle Limited Tool exist & and available 412. If no, the Last lot on tester is same product as SHR lot 414 is tested, then the Last lot on tester use same P/C as SHR lot 416, P/C available or needless 418. Then Find the tool with lowest priority lot and lower than specified lot's 420 is checked. If a Yes to any of these is determined, then it Interrupt the Tool 402 in FIG. 4C. However, if the test for P/C or L/B available of needness 418 422 is negative, a Show no P/C, L/B warning message on PUI 424 426 is created with No P/C Warning 428 or No L/B warnings created for manual action.

Additional logic shown in FIG. 4C shows a test for looking for an Idle Tools that exist & P/C(L/B) available 441. A Yes, Interrupts the Tool 402 as does the other decisions results shown. If negative, then check are made for Tools with the same product 440, and Find the tool with the lowest priority lot and lower than specified lot's 444. If not the same product, the test Tools with same P/C 442 is made. The tests for P/C and L/B available or needless 446 448 are made. If they are negative, Show no P/C or L/B warning message on PUI 450 454 is created, and a No P/C or No L/B warning is created for manual action. FIG. 4B shows the logic from a negative response from Find the tool with the lowest priority lot and lower than specified lot's 444. A test is made for Tools with the same product 460. If yes, then Find the tool with the lowest priority lot of same product and assign this lot to this tester. 462. If not, then Find the tool with the lowest priority lot and assign this lot to this tester 464.

Figure 5A:
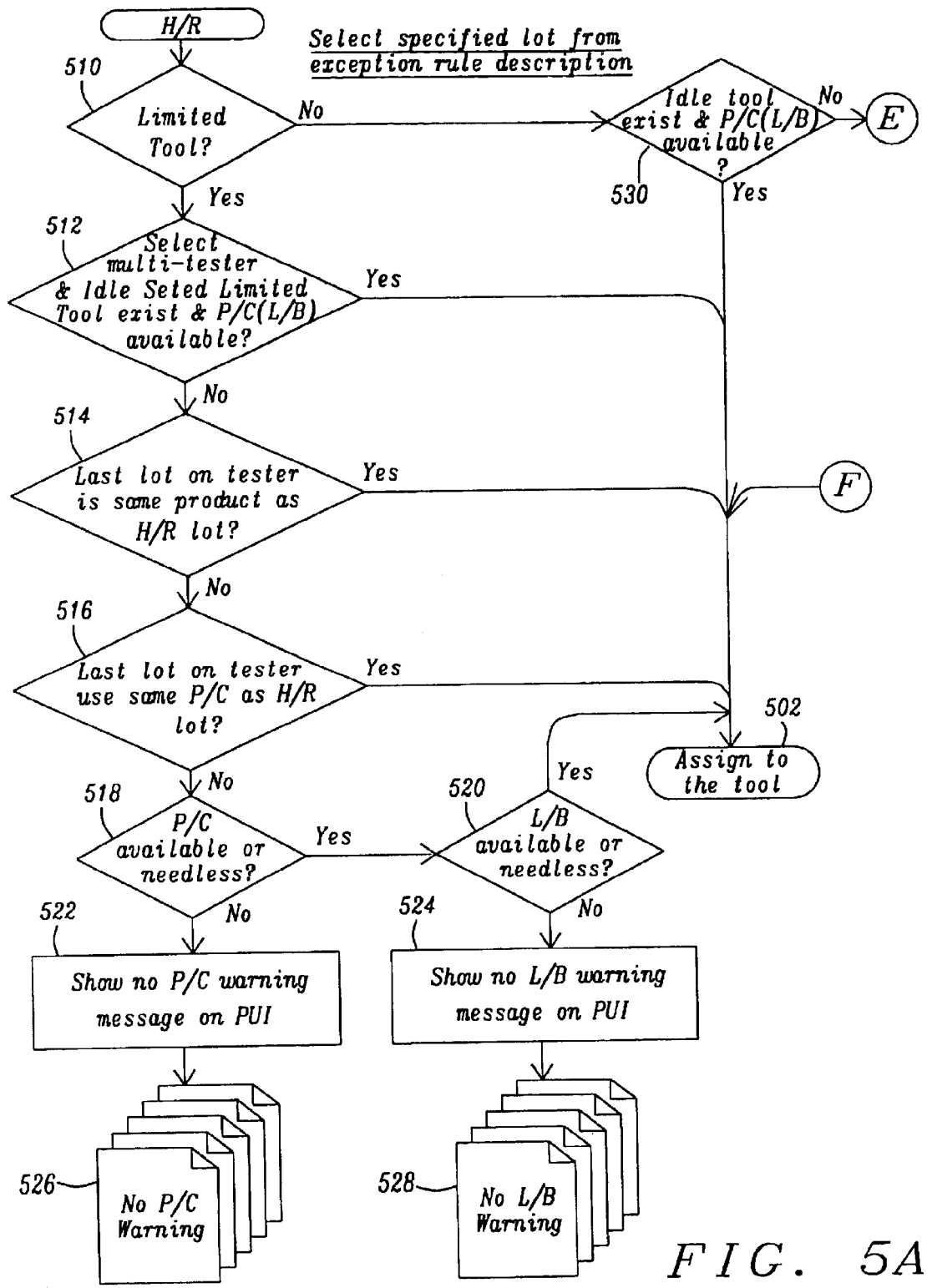
FIGS. 5A, and 5B are a flow diagram of the Hot Run (HR) lot-assignment step procedures in the new method.

The flow diagram of the Hot Run (HR) lot-assignment step procedures of FIGS. 5A, and 5B again shows how the yes or no answer at each step puts it to a proper next step with the same goal of maximum tester utilization, minimum setup time, and maximum throughput dispatching performance similar to that shown in FIGS. 4A, 4B, and 4C. FIG. 5A shows similar logic as before to check if there is a Limiter Tool 510. A negative response tests for Idle tool exits & P/C(L/B) available 530, Select multi-tester & Idle Speed Limited Tool exits & P/C(L/B) available 512, Last lot on tester is same product as H/R lot 514, Last lot on tester use same P/C as H/R lot 516, P/C available or needless 518, and L/B available or needless 520. The HR is optimally Assigned to the Tool 502. An negative response cause the Show no P/C warning message on PUI 522 and no L/B warning message on PUI 524, with a No P/C warning 526 or No L/B warning 528 message being sent for manual action to be taken.

Figure 5B:
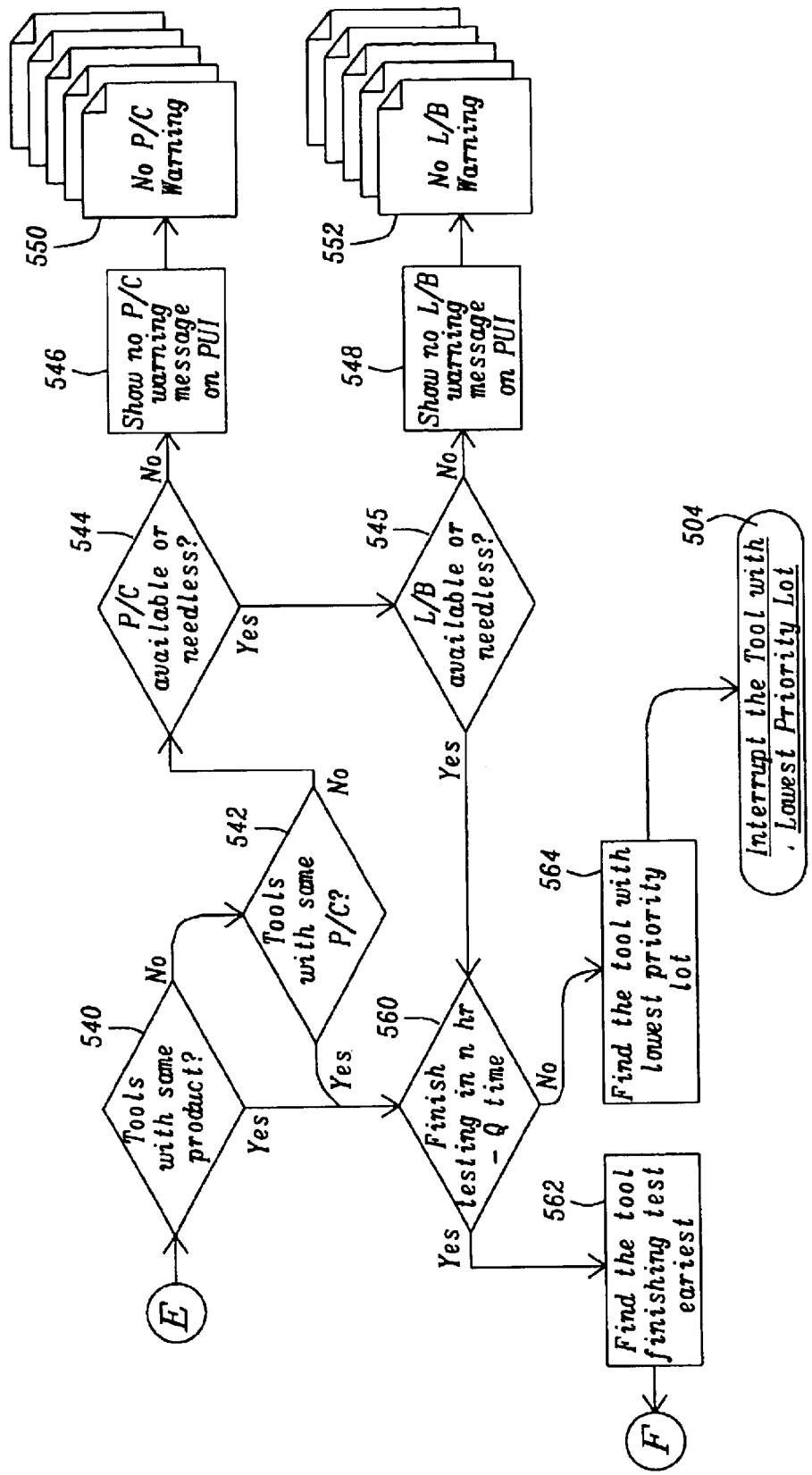

FIG. 5B shows the logic for no idle tools being available. Negative responses tests Tool with same product 540, tools with same P/C 542, and P/C available or needless 544. This leads again to Show no P/C warning message on PUI 546 and Show no L/B warning message on PUI 548. This providing a No P/C Warning message 550 or a check for L/B available or needless 545, and no L/B warning message on PUI 552 for manual action to be taken. The positive responses logic from the Tools with the same product 540 response, leads to Finish in n hr—Q time 560. If yes, next is to Find the tool finishing test earliest and Assign the Tool 562. If no, next is to Find the tool with lowest priority lot 564 and Interrupt the Tool with Lowest Priority Lot 504.

Figure 6A:
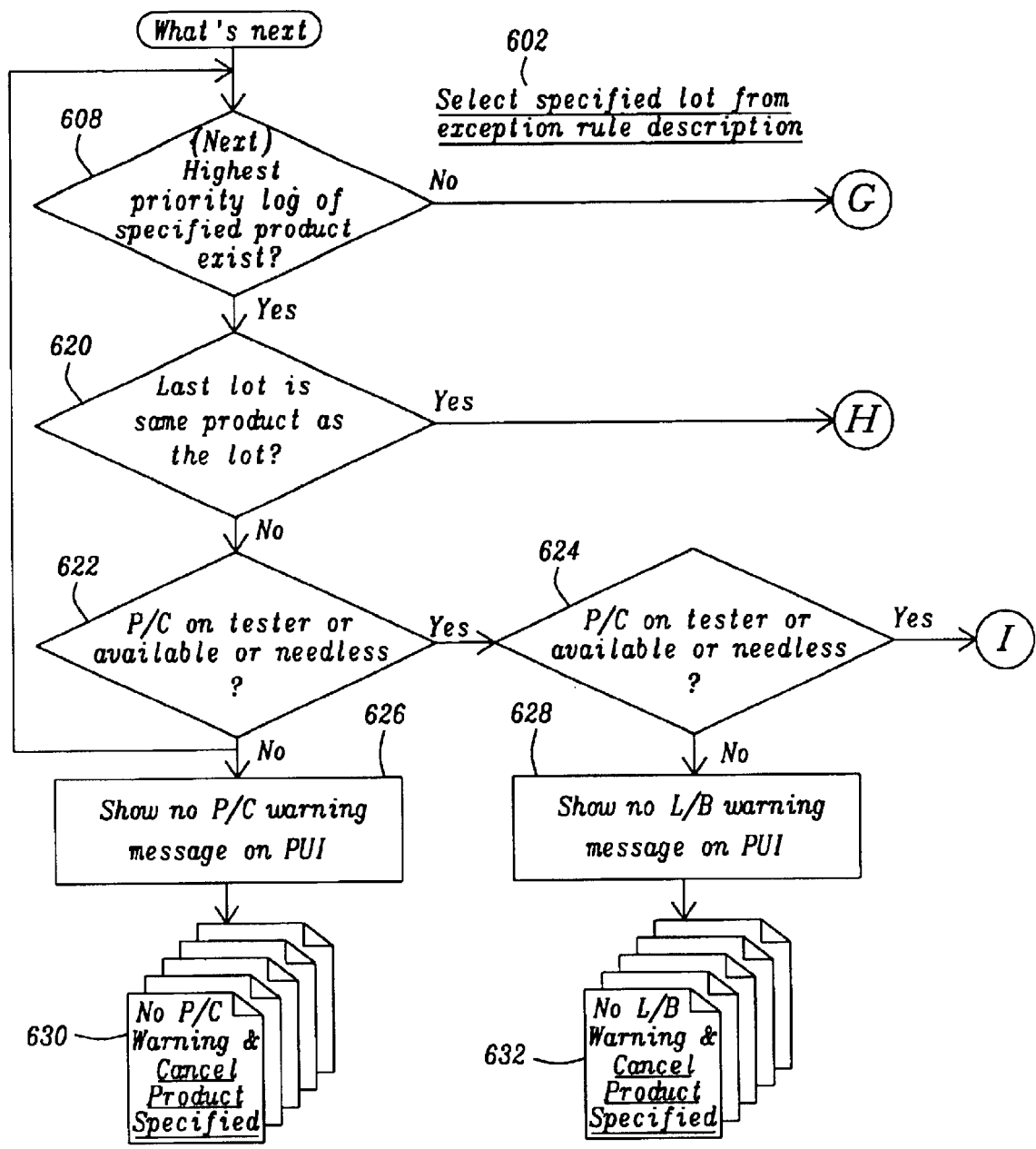
FIGS. 6A, 6B, 6C, and 6D are a flow diagram of overall step procedures in lot assignment.
Figure 6B:
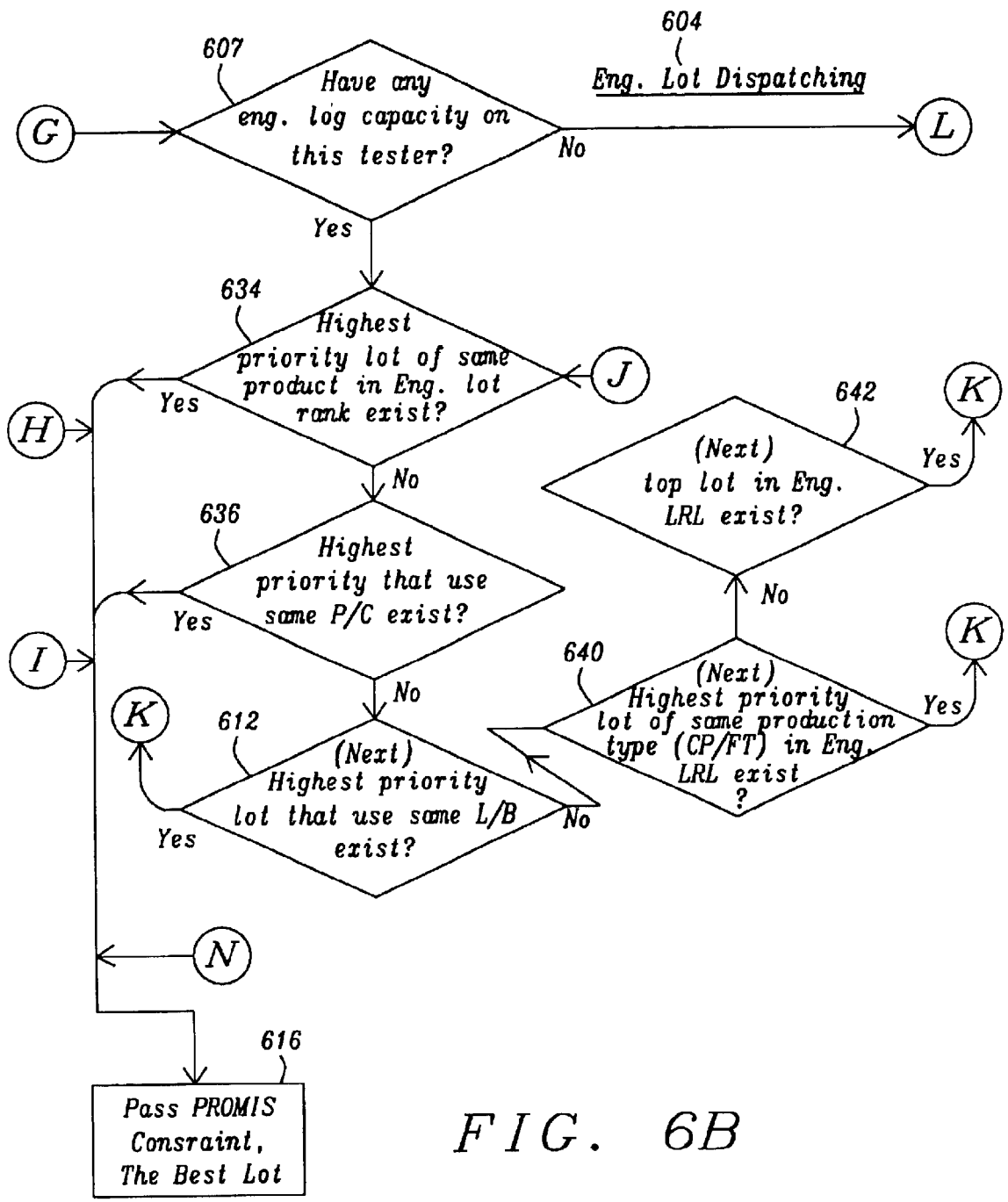

The flow diagram of overall step procedures in lot assignment of FIGS. 6A, 6B, 6C, and 6D show three distinct areas of step procedures. The first, shown on FIG. 6A, is Selecting specified lots from exception rule description 602 in which it is determined if (Next) Highest priority lot of specified product exists 608. Then testing for Last lot is same product as the lot 620, P/C on tester or available or needless 622 and P/C on tester or available or needless 624. A negative to all these tests would cancel the product specified with Show no P/C warning message on PUI 626 with No P/C Warning & Cancel Product Specified 630. Also possible is, Show no L/B warning on PUI 628 with No L/B Warning & Cancel Product Specified 632. FIG. 6B shows this negative logic within the dashed line.

The second set of tests is shown in FIG. 6B. It is Engineering Lot Dispatching 604 in which Have any engineering lot capacity on this tester 610 is a check to determine if the amount of fixed testing time per week determined by testing site personnel for engineering lots to be tested on any particular machine has been exceeded. Checks for Highest priority lot of same product in Eng. Lot rank exist 634, Highest priority that use sam P/C exist 636, Highest priority lot that use same L/B 612, Highest priority lot of same production type (CP/FT) in Eng. LRL exist 640, and is it the next on top of Eng. LRL exist 642 The engineering lots are dispatched automatically with manual effort only needed for setting exception rules and taking care of special cases, thereby eliminating the need for a manual dispatching sheet. The successful lot is passed to Pass PROMIS Constraint, Best of Lot 616.

Figure 6C:
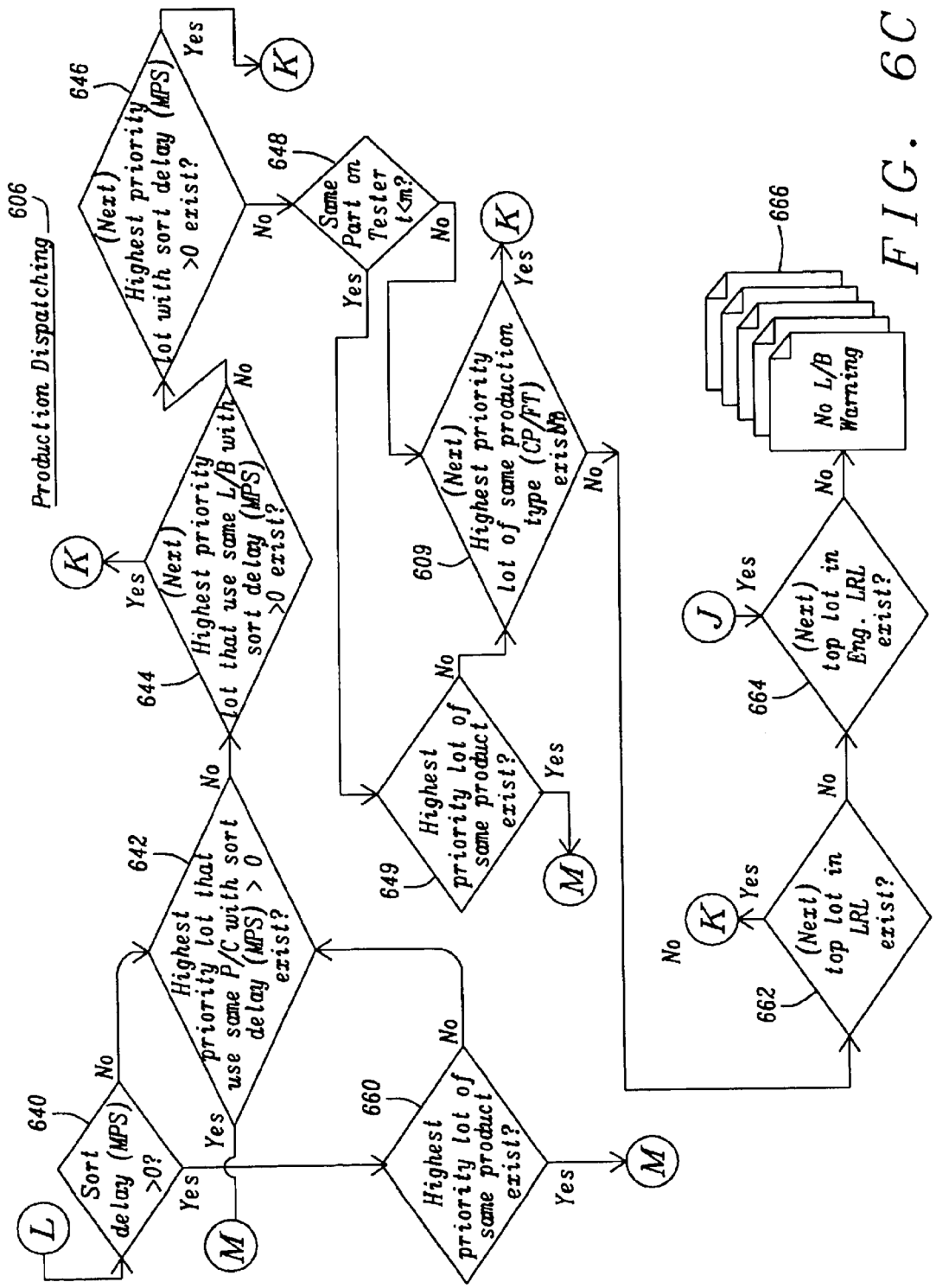
Figure 6D:
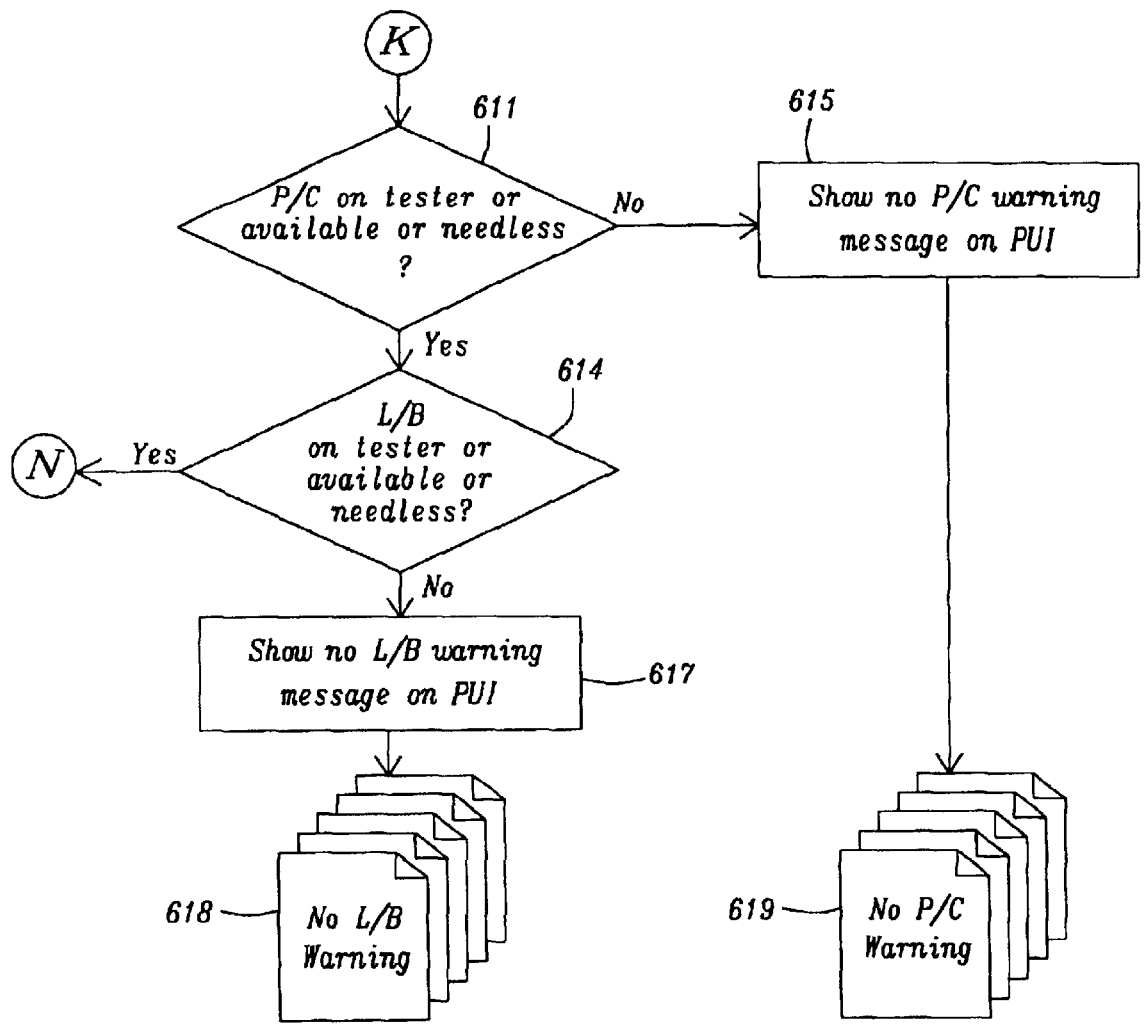

Additional priority logic is shown in FIG. 6D. Is the P/C on tester or available or needless? 611. If Yes, the is the L/B on tester or available or needless 614. If Yes, it move on to try to be the best lot. For a negative response a Show no L/B warning message on PUI 615 produced and a No L/B warning 618 for manual action is created. For a negative response to the P/C tester available, a Show no P/C warning message on PUI 615 is created and a No P/C Warning 619 is provided for manual action.

FIG. 6C shows the third set of logic of Production Dispatching 606. After testing for sort delays greater that zero 640 646, and highest priorities with same P/C, L/B, 642 644, and checking for the same part on the tester 648, the test for the (Next) Highest priority lot of same production type (CP/FT) exist 609 is done (after it is determined that no Highest priority lot of same product exist? 649). This illustrates how the step procedures have been expanded to consider different product lots in addition to same products to utilize any of the same auxiliary apparatus without need for new setup. Several step procedures throughout the flow chart choose lots (same product or not) that can utilize incorporated auxiliary apparatus without need for new setup. If a negative to for highest priorities with same P/C 642 is the result, then a check for Highest priority lot of same product exist 660 is make as for Sort delay (MPS) less than zero 640. A negative for (Next) Highest priority lot of same production type (CP/FT) exist 609 causes a check for (Next) top lot in LRL exist 662 and another negative a check for (Next) top lot in Eng. LRL exist 664. If no, a No L/B Warning 666 is created for manual action.

Dispatching conflict between wafer and package lots is avoided by having step procedures make sure that no wafer work in progress remains before allowing package lots to be dispatched with the result of minimal changeovers. In a sense, package lots are treated as an engineering step procedure with the added considerations of dispatching the same product or same production type as the lot just tested and the resource constraint of the Load Board (L/B). This can be seen in FIG. 6B in (Next) Highest priority lot that use same L/B exist 612, in FIG. 6A (Next) Highest priority lot of same production type (CP/FT) exist 608, and in FIG. 6D, L/B on tester or available or needless 614.

Tester constraints are considered by using the commonly used PROMIS constraint system, as shown in the last step procedure in FIG. 6B, Pass PROMIS Constraint 616. This constraint system provides a function for users to limit a tester's product capability so that the PROMIS constraint system can filter out inappropriate lots to avoid mistake operations. In one location, mistake operations went from an average of 3 times a month to 0 after the new system was in place.

The method of the invention provides advantages over the prior art including using a two-phased, event-driven dispatching method and system with step procedures to in real time determine on-line the most favorable dispatching solution (replacing a daily manual dispatching sheet), taking care of special events by exception rules in the system to further cut down on daily dispatching manual effort, dispatching engineering lots automatically, integrating with PROMIS constraint function to explicitly separate engineering problems from production plan and to consider tester constraints to reduce mistake operations, solving dispatching conflict between wafer and package lots, and reducing setup time by considering other products in addition to same product that could use the same tester without need for new setup and considering that different lots could use the same probe card and load board again.

While the invention has been particularly shown and described with reference to preferred embodiments thereof, it will be understood by those skilled in the art that various changes in form and details may be made without departing from the spirit and scope of the invention.

What is claimed is:

1. A method for dynamic adjustment of priority and step procedures for determining effective lot dispatching for wafer and chip probing, comprising:
   A. using a two-phased, event-driven dispatching system structure, comprising lot rank and lot assignment, for said dynamic adjustment, wherein said lot rank comprises a lot rank priority formula for production wafers and packages, and a lot rank for engineering lots, and wherein said priority formula of:

Priority=$\Sigma(Base*Weight_x)$ calculates priority;

B. using said step procedures to choose lots that can utilize incorporated auxiliary apparatus without need for new setup;
   C. providing for engineering lots capacity check in said step procedures;
   D. solving dispatching conflict between wafer and package lots, and
   E. limiting tester's capability in product through use of common constraint system.

2. The method for dynamic adjustment of priority and step procedures of claim 1, wherein said lot assignment comprises exception lots, hot run, super hot run, normal lot, and engineering lot dispatching rule with the object being based on Master Production Schedule target to reduce setup time.

3. The method for dynamic adjustment of priority and step procedures of claim 1, wherein dispatch in a test foundry can be affected by performance indices, special dispatch properties, auxiliary apparatus, tester constraints, and production mode.

4. The method for dynamic adjustment of priority and step procedures of claim 1, wherein said auxiliary apparatus includes tester, probe card, and load board.

5. The method for dynamic adjustment of priority and step procedures of claim 1, wherein said step procedures are expanded to consider different product lots in addition to same products to said utilize any same said auxiliary apparatus without need for new set up.

6. The method for dynamic adjustment of priority and step procedures of claim 1, wherein said dispatching conflict between wafer and package lots is avoided by having said step procedures make sure no wafer work in progress remains before allowing said package lots to be dispatched with the result of minimal changeovers.

7. The method for dynamic adjustment of priority and step procedures of claim 6, wherein said package lots are treated as an engineering step procedure with a added considerations of dispatching a same product or same production type as a lot just tested and resource constraint of a load board.

8. The method for dynamic adjustment of priority and step procedures of claim 1, wherein said common constraint system is a PROMIS constraint system.

9. A method for dynamic adjustment of priority and step procedures for determining effective lot dispatching for wafer and chip probing, comprising:
   A. using a two-phased, event-driven dispatching system structure for said dynamic adjustment;
   B. using said step procedures to choose lots that can utilize incorporated auxiliary apparatus without need for new setup;
   C. providing for engineering lots capacity check in said step procedures;
   D. solving dispatching conflict between wafer and package lots, and
   E. limiting tester's capability in product through use of common constraint system,
   wherein a multi-priority factor and multi-dispatching step procedure is enhanced to fit complex dispatching demands of a test foundry and used with chip probing and final testing.

10. A method for dynamic adjustment of priority and step procedures for determining effective lot dispatching for wafer and chip probing, comprising:
    A. using a two-phased, event-driven dispatching system structure for said dynamic adjustment;
    B. using said step procedures to choose lots that can utilize incorporated auxiliary apparatus without need for new setup;
    C. providing for engineering lots capacity check in said step procedures;
    D. solving dispatching conflict between wafer and package lots, and
    E. limiting tester's capability in product through use of common constraint system,
    wherein said method is based on distinct production goals or behavior reported by production and engineering devices to in real time get the most desirable dispatching list for a particular tester at any given time.

11. A method for dynamic adjustment of priority and step procedures for determining effective lot dispatching for wafer and chip probing, comprising:
    A. using a two-phased, event-driven dispatching system structure for said dynamic adjustment;
    B. using said step procedures to choose lots that can utilize incorporated auxiliary apparatus without need for new setup;
    C. providing for engineering lots capacity check in said step procedures;

D. solving dispatching conflict between wafer and package lots, and

E. limiting tester's capability in product through use of common constraint system, wherein said engineering lot capacity limitation check is done to see if the amount of fixed testing time per week determined by testing site personnel for engineering lots to be tested on any particular machine has been exceeded.

12. The method for dynamic adjustment of priority and step procedures of claim 11, wherein said engineering lots are dispatched automatically with manual effort only needed for setting exception rules and taking care of special cases thereby eliminating need for manual dispatching sheet.

13. A method for dynamic adjustment of priority and step procedures for determining effective lot dispatching for wafer and chip probing, comprising:

A. using a two-phased, event-driven dispatching system structure for said dynamic adjustment;

B. using said step procedures to choose lots that can utilize incorporated auxiliary apparatus without need for new setup;

C. providing for engineering lots capacity check in said step procedures;

D. solving dispatching conflict between wafer and package lots, and

E. limiting tester's capability in product through use of common constraint system, wherein said common constraint system is a PROMIS constraint system, and wherein said PROMIS constraint system provides a function for users to limit said tester's product capability from which said step procedure's last step is to check said PROMIS constraint system to filter out inappropriate lots to avoid mistake operations.

14. A system for dynamic adjustment of priority and step procedures for determining effective lot dispatching for wafer and chip probing, comprising:

a means to use a two-phased, event-driven dispatching system structure for said dynamic adjustment, wherein said two-phased, event-driven dispatching system structure comprises lot rank and lot assignment, said lot rank comprises of a lot rank priority formula for production wafers and packages and a lot rank for engineering lots, and wherein said priority formula of:

Priority=Σ(Base*Weight$_x$) calculates priority;

a means to use said step procedures to choose lots that can utilize incorporated auxiliary apparatus without need for new setup;

a means to provide engineering lots capacity check in said step procedures;

a means to solve dispatching conflict between wafer and package lots, and means to limit tester's capability in product through constraint.

15. The system for dynamic adjustment of priority and step procedures of claim 14, wherein said lot assignment to comprises of exception lots, hot run, super hot run, normal lot, and engineering lot dispatching rule with the object of being based on Master Production Schedule target to reduce setup time.

16. The system for dynamic adjustment of priority and step procedures of claim 14, wherein dispatch in a test foundry can be affected by performance indices, special dispatch properties, auxiliary apparatus, tester constraints, and production mode.

17. The system for dynamic adjustment of priority and step procedures of claim 14, wherein said auxiliary apparatus includes tester, probe card, and load board.

18. The system for dynamic adjustment of priority and step procedures of claim 14, wherein said step procedures are expanded to consider different product lots in addition to same products to said utilize any same said auxiliary apparatus without need for new set up.

19. The system for dynamic adjustment of priority and step procedures of claim 14, wherein said dispatching conflict between wafer and package lots is avoided by having said step procedures make sure no wafer work in progress remains before allowing said package lots to be dispatched with the result of minimal changeovers.

20. The system for dynamic adjustment of priority and step procedures of claim 19, wherein said package lots are treated as an engineering step procedure with added considerations of dispatching same product or same production type as a lot just tested and resource constraint of a load board.

21. The system for dynamic adjustment of priority and step procedures of claim 14, wherein a common constraint system is a PROMIS constraint system.

22. The system for dynamic adjustment of priority and step procedures of claim 21, wherein said PROMIS constraint system provides a function for users to limit said tester's product capability from which said step procedure's last step is to check said PROMIS constraint system to filter out inappropriate lots to avoid mistake operations.

23. A system for dynamic adjustment of priority and step procedures for determining effective lot dispatching for wafer and chip probing, comprising:

a means to use a two-phased, event-driven dispatching system structure for said dynamic adjustment, a means to use said step procedures to choose lots that can utilize incorporated auxiliary apparatus without need for new setup;

a means to provide engineering lots capacity check in said step procedures;

a means to solve dispatching conflict between wafer and package lots, and means to limit tester's capability in product through constraint, wherein a multi-priority factor and multi-dispatching step procedure is enhanced to fit complex dispatching demands of a test foundry and used with chip probing and final testing.

24. A system for dynamic adjustment of priority and step procedures for determining effective lot dispatching for wafer and chip probing, comprising:

a means to use a two-phased, event-driven dispatching system structure for said dynamic adjustment, a means to use said step procedures to choose lots that can utilize incorporated auxiliary apparatus without need for new setup;

a means to provide engineering lots capacity check in said step procedures;

a means to solve dispatching conflict between wafer and package lots, and means to limit tester's capability in product through constraint, wherein based on distinct production goals or behavior reported by production and engineering devices to in real time get the most desirable dispatching list for a particular tester at any given time.

25. A system for dynamic adjustment of priority and step procedures for determining effective lot dispatching for wafer and chin probing, comprising:

- a means to use a two-phased, event-driven dispatching system structure for said dynamic adjustment,
- a means to use said step procedures to choose lots that can utilize incorporated auxiliary apparatus without need for new setup;
- a means to provide engineering lots capacity check in said step procedures;
- a means to solve dispatching conflict between wafer and package lots, and
- means to limit tester's capability in product through constraint,
- wherein said engineering lot capacity limitation check is done to see if the amount of fixed testing time per week determined by testing site personnel for engineering lots to be tested on any particular machine has been exceeded.

26. The system for dynamic adjustment of priority and step procedures of claim 25, wherein said engineering lots are dispatched automatically with manual effort only needed for setting exception rules and taking care of special cases thereby eliminating need for manual dispatching sheet.

* * * * *